United States Patent Office

3,308,152
Patented Mar. 7, 1967

3,308,152
1,1,1,3,3,5,5,5-OCTA-(TRIMETHYLSILOXY)-
2,2,4,4-TETRAMETHYLPENTASILOXANE
Charles W. Lentz, Midland, Mich., assignor to Dow Corning Corporation, Midland, Mich., a corporation of Michigan
No Drawing. Filed Aug. 28, 1963, Ser. No. 305,191
1 Claim. (Cl. 260—448.2)

This invention relates to 1,1,1,3,3,5,5,5-octa(trimethylsiloxy)2,2,4,4-tetramethylpentasiloxane.

This new compound is useful, for example, in "fluid springs," as a hydraulic fluid, as a lubricant and as a modifier for other compatible siloxane fluids.

The compound can be prepared, for example, by the reaction of

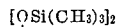
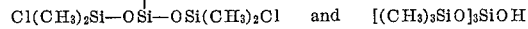
and [(CH₃)₃SiO]₃SiOH in the presence of an HCl acceptor.

In order that those skilled in the art can better understand how the present invention can be practiced, the following examples are given by way of illustration and not by way of limitation.

*Example 1*

To a three liter flask equipped with a stirrer, 890 ml. (2 mols) of [(CH₃)₃SiO]₄Si, 536 g. (4 mols of

[(CH₃)₂HSi]₂O and 120 g. (50% toluene) of drained Amberlyst-15 ion exchange resin were added. (Amberlyst-15 is a cationic ion exchange resin containing sulfonic acid functional groups. It is in the form of beads about 1 to 3 mm. in diameter.) This mixture was stirred for about 23 hours at room temperature and then the liquid was decanted from the resin. Then 890 ml. of [(CH₃)₃SiO]₄Si and 536 g. of [(CH₃)₂HSi]₂O were again added to the resin catalyst and the mixture stirred for about 5 hours at room temperature. The liquid was then decanted from the resin and combined with the first decant above. The liquid was then stripped to remove low boiling materials, washed two times with water, dried and then filtered. Fractionation of the liquid yielded 205 g. (about 200 cc.) of

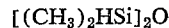

To a 500 ml. three neck flask fitted with a thermometer, scrubber, gas dispersion tube and magnetic stirrer, 75 g. of

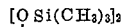
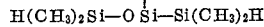

and 100 ml. of carbon tetrachloride were added. The flask was wrapped with aluminum foil and cooled with an ice bath. Chlorine was added to the flask at the rate of 100 cc. per minute for about two hours and 15 minutes. During this time the temperature rose from 3° C. to 17° C. The chlorine was turned off and then the mixture swept with air. Fractionation of the liquid yielded 29 g. (about 31 cc.) of

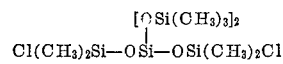

*Example 2*

To a three neck equipped with a thermometer, stirrer and addition funnel, 150 ml. of toluene, 23 g. of

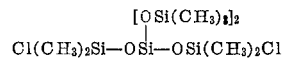

and 10.8 ml. of alpha-picoline were added. Then, while stirring, 39.2 g. of [(CH₃)₃SiO]₃SiOH (about 90 percent pure) was added to the mixture dropwise at 20 to 30° C. over a period of about ½ hour. Upon completion of the addition, the addition funnel was rinsed with about 15 ml. of toluene and the stirring continued for ½ hour. The mixture was then heated enough to melt the alpha-picoline hydrochloride and then allowed to stand, without agitation, until cool. The solid was then removed and the remaining liquid washed four times, the first wash being with about 300 ml. of a 5 percent HCl solution and the last three washes being with about 300 ml. of water. Next the mixture was azeotroped and stripped to a pot temperature of 150° C. to remove most of the toluene. The remaining liquid was fractionated with 31.5 g. (about 34 cc.) of 1,1,1,3,3,5,5,5-octa(trimethylsiloxy)-2,2,4,4-tetramethylpentasiloxane being collected over a temperature range of 158 to 161° C. at about .5 mm. of pressure. This compound has a viscosity of 24.8 cs. at 25° C. The purity of this compound was confirmed employing an F and M Vapor Phase Chromatography model 500 apparatus. The structural formula of this compound, as confirmed by infrared spectroscopy, is

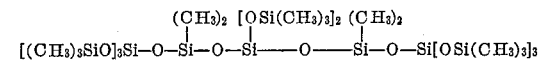

That which is claimed is:
1,1,1,3,3,5,5,5-octa(trimethylsiloxy)-2,2,4,4 - tetramethylpentasiloxane which has the formula

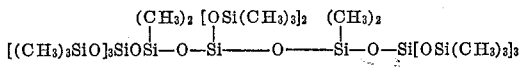

No references cited.

TOBIAS E. LEVOW, *Primary Examiner.*

P. F. SHAVER, *Assistant Examiner.*